United States Patent [19]

Fischer

[11] Patent Number: 5,199,638
[45] Date of Patent: Apr. 6, 1993

[54] DUAL AUGER MANURE SPREADER HAVING CONTROLLED BEATER FEED

[75] Inventor: Thomas R. Fischer, Wapakoneta, Ohio

[73] Assignee: Allied Products Corporation, Chicago, Ill.

[21] Appl. No.: 854,717

[22] Filed: Mar. 23, 1992

[51] Int. Cl.$^5$ .............................................. A01C 3/06
[52] U.S. Cl. ....................................... 239/7; 239/675; 239/676; 239/680; 414/502; 414/526
[58] Field of Search ..................... 239/7, 662, 670, 675, 239/676, 680; 414/502, 526

[56] References Cited

U.S. PATENT DOCUMENTS

| | | |
|---|---|---|
| 1,038,814 | 9/1912 | Alexander . |
| 2,891,655 | 6/1959 | Saiberlich . |
| 3,206,215 | 9/1965 | De Jong . |
| 3,228,701 | 1/1966 | Smith et al. . |
| 3,508,683 | 4/1970 | Van der Schee . |
| 3,605,995 | 9/1971 | Maack . |
| 3,851,804 | 12/1974 | Fyrk . |
| 3,997,118 | 12/1976 | Bedwell . |
| 4,078,729 | 3/1978 | Foltz . |
| 4,124,166 | 11/1978 | Lucas . |
| 4,298,289 | 11/1981 | Walley . |
| 4,350,303 | 9/1982 | van der Lely . |
| 4,362,272 | 12/1982 | Martin . |
| 4,373,845 | 2/1983 | Henke . |
| 4,377,364 | 3/1983 | Weaver . |
| 4,455,111 | 6/1984 | Jackson et al. . |
| 4,467,967 | 8/1984 | Martin . |
| 4,473,184 | 9/1984 | Martin . |
| 4,475,692 | 10/1984 | Walley . |
| 4,479,608 | 10/1984 | Martin . |
| 4,555,061 | 11/1985 | Linde . |
| 4,597,532 | 7/1986 | Linde et al. . |
| 4,619,405 | 10/1986 | Linde . |
| 4,669,670 | 6/1987 | Linde et al. . |
| 4,709,861 | 12/1987 | Henderson . |
| 4,720,047 | 1/1988 | Knight et al. . |
| 4,801,085 | 1/1989 | Fischer . |
| 4,819,880 | 4/1989 | Linde et al. . |
| 4,823,936 | 4/1989 | Lesar . |
| 4,832,267 | 5/1989 | Meek . |
| 4,993,632 | 2/1991 | Martin . |
| 5,085,372 | 2/1992 | Martin . |

FOREIGN PATENT DOCUMENTS

| | | | |
|---|---|---|---|
| 151567 | 5/1953 | Australia . | |
| 989895 | 5/1976 | Canada . | |
| 47285 | 4/1977 | Japan . | |
| 158355 | 11/1978 | Netherlands | 239/675 |
| 204851 | 5/1966 | Sweden . | |
| 2157142 | 10/1985 | United Kingdom . | |
| 2173682 | 10/1986 | United Kingdom | 239/675 |

OTHER PUBLICATIONS

Knight Auggie brochure.
Rex Super Spreader brochure.

*Primary Examiner*—Andres Kashnikow
*Assistant Examiner*—William Grant
*Attorney, Agent, or Firm*—Lockwood, Alex, Fitzgibbon & Cummings

[57] ABSTRACT

A manure spreader device and method of distributing any of a variety of manure materials having varying consistencies are provided. The device and method embody a concept in which a plurality of elongated augers that are longitudinally positioned within a translatable bin deliver manure material to an outfeed location for translation of the manure material to a beater assembly which distributes the manure material onto a field or the like. A slippage characteristic is exhibited at the outfeed location whereby, when manure material within the outfeed location exceeds the expelling rate capacity of the beater assembly, slippage occurs between the manure material and rotating blades at the outfeed location so as to avoid overloading of the beater assembly by the particular manure material being spread.

21 Claims, 5 Drawing Sheets

DUAL AUGER MANURE SPREADER HAVING CONTROLLED BEATER FEED

BACKGROUND OF THE INVENTION

The present invention generally relates to a manure spreading apparatus and method which incorporate the use of dual longitudinal augers that feed most types of manure into a beater assembly having a vertical axis in order to thereby throw the manure onto an agricultural field or the like. The invention more particularly relates to feeding manure along an elongated dual auger assembly and dropping same into an outfeed means for feeding the manure into the beater assembly in accordance with the capacity of the beater assembly to handle and expel the particular manure being spread, which can be of any variety of consistencies. The manure spreader is typically of the type that is pulled by a tractor or the like and that is run from the power takeoff (PTO) thereof.

In the field of manure spreading, two objectives have been sought but have been found to be difficult to attain. One of these objectives is to provide manure spreaders and manure spreading procedures that are as versatile as possible, especially regarding the types of manure that can be spread. More specifically, manures vary in composition and consistency from those that are predominantly liquid to those that are predominantly semi-solid or solids-containing. Furthermore, certain manures have an especially sticky consistency, and they tend to adhere to manure spreader components and surfaces. Manures can also contain fibrous plant and vegetable waste material and debris. Specific debris can include stones, straw and the like. Manures can be characterized as varying in composition from that of a watery slurry to that of a semi-solid mixture. It is desirable that a manure spreader be able to handle any of these types of manures and to have the ability to distribute same evenly across an agricultural field or the like.

Another principal objective of manure spreading is to avoid the difficulty of having the mechanisms become clogged during use and to avoid the somewhat related difficulty of experiencing bridging which is an especially troublesome problem for manures that have a sticky consistency. Such manures tend to clump into a large solid mass that cannot be readily fed by the manure spreader without breaking up the clump or bridge. In the case of manure spreaders having a longitudinal auger near the bottom of the bed of the device, the manure can bridge between the upstanding walls of the device to the extent that the flow of manure into the auger is severely restricted or prevented. Previous attempts to solve this problem have included movement of the auger into the bridged manure in an attempt to break up the bridge.

In other manure spreaders, clogging, bridging, or damage can occur in the vicinity of the expelling mechanism where the manure delivery means is too aggressive for the expeller mechanism when handling thicker or more sticky manures. Under certain conditions, manure can become compacted if the manure begins to back up just before or within the expeller mechanism. In some spreaders, the manure is swept into the expeller mechanism by shovel, scoop or scraper devices that deliver a given volume of manure at a generally constant rate regardless of the ability of the expeller mechanism to handle it.

Problems of these types are brought under control by utilizing the apparatus according to the present invention which is capable of handling wide varieties of manures. The invention addresses itself to these problems by an approach that is directed toward substantially preventing the formation of bridges, rather than one which seeks to break bridges that have already been formed or have been partially formed, and to an approach which automatically adjusts the flow rate of manure delivered to the expeller mechanism depending upon the ability of the expeller mechanism to handle the particular type of manure being spread.

SUMMARY OF THE INVENTION

The manure spreader according to the present invention includes dual, side-by-side augers positioned within and at the bottom of a manure spreader bin having a wide-mouth overall configuration, with the augers being positioned for moving the manure generally forwardly within the bottom portion of the open-mouth orientation. Each auger has at least two distinct profiles. A portion of the auger, typically running for the greater portion of the length of the auger, exhibits a profile for moving the manure generally longitudinally. Another auger profile is provided at an outfeed location, this outfeed auger profile having a shaft with a cross-sectional size less than that of the other profile of the auger. The outfeed auger profile has a slippage characteristic whereby its movement of manure will be retarded automatically when the manure beings to back up at the beater mechanism downstream of the outfeed location. Improved interaction with the outfeed structures is achieved by having the beater mechanism include beater blades mounted along one or more generally vertical shafts. The beater mechanism receives the manure and expels it in a generally broad pattern from a side of the manure spreader.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENTS

Figure 1:
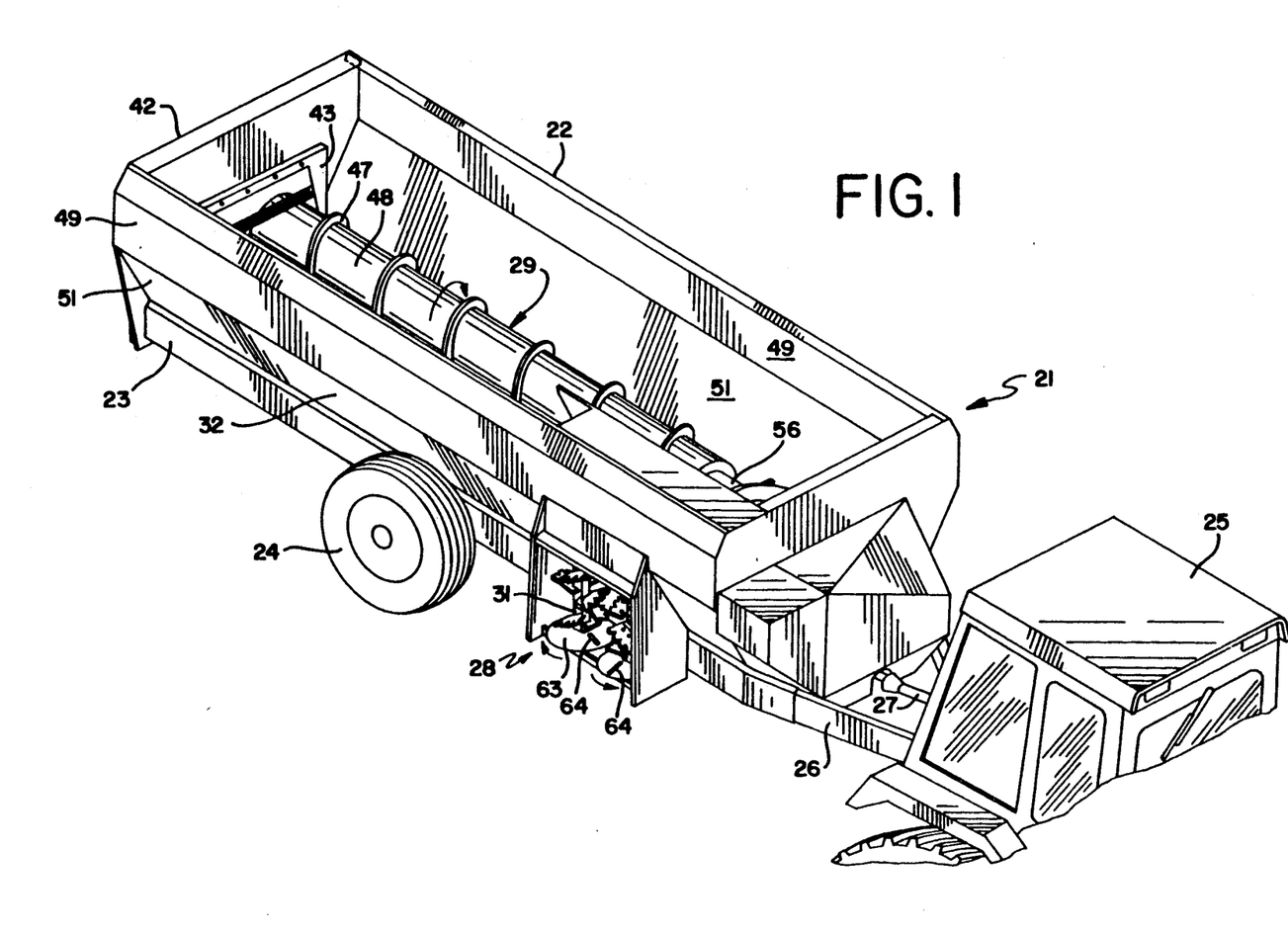
FIG. 1 is a perspective view of a preferred embodiment of the manure spreader, shown in driven communication with a pulling vehicle.

A manure spreader, generally designated as 21 in FIG. 1, includes a bin 22 mounted onto a frame 23 having ground-engaging wheels 24. A pulling vehicle 25 such as a tractor is shown in pulling and driving engagement with the manure spreader 21 through a tongue 26 and a drive shaft 27 in communication with the PTO of the pulling vehicle 25. Manure spreader 21 includes a beater assembly, generally designated as 28, and at least two auger assemblies, generally designated as 29, 39, that are longitudinally oriented within the bin 22 and that feed manure material or the like into the beater assembly 28. Auger assemblies 29, 39 and the beater assembly 28 communicate through an opening 31 in a sidewall 32 that is selectively opened and closed by a gate 33 which is typically vertically slidably mounted within a gate track 34. Gate 33 may be suitably operated by a device such as the illustrated piston and cylinder assembly 35.

Figure 5:
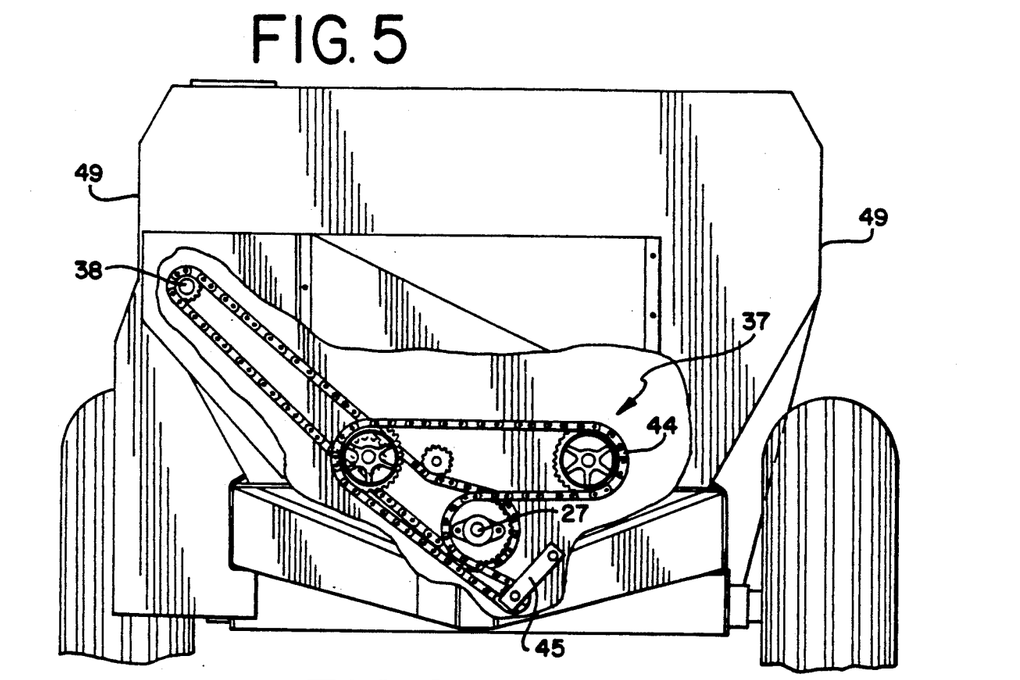
FIG. 5 is a front end elevational view of the device, with a portion of the protective covering thereover being broken away.

A chain and sprocket assembly, generally designated as 37, transmits the rotational energy of the drive shaft to beater assembly 28 and to the auger assemblies 29, 39. The preferred manner by which the chain and sprocket assembly 37 transmits the rotational energy of the drive shaft 27 is illustrated in FIG. 5. Each vertical shaft 36 of the beater assembly 28 is mounted by suitable drive devices, typically including a drive shaft 38 and suitable gearing or the like in order to rotate the vertical shafts 36 upon movement of the chain and sprocket assembly 37. The gearing and sprockets are arranged so the beater assembly 28 is driven in order to impart a relatively fast angular velocity to each vertical shaft 36. The sprockets and the gearing components slow the PTO drive speed by as much as thirty times or more and provide increased torque. A typical arrangement has an auger speed of between about 12 and 18 rpm, while the vertical shafts 36 of the beater assembly 28 rotate at speeds between about 700 and about 900 rpm. An example of suitable speeds are 15 rpm for the augers and 860 rpm for the beaters.

Each auger assembly 29, 39 is mounted to the rear end wall 42 by a bearing assembly 43 of generally known construction. Each auger assembly 29, 39 is rotatably mounted through front end wall 41 by a suitable arrangement. The preferred arrangement includes a bearing mount and driving planetary reducers of known construction. Both planetary reducers are driven by a single drive chain 44. An idler arm assembly 45 is included.

Auger assembly 29, 39 includes at least two different auger profiles. One auger profile includes relatively shallow auger flights 47 mounted over shafts 48 that have a large or broad cross-section, the illustrated shafts 48 having a large outer diameter that is substantially the same as the nominal inner diameter of the shallow auger flights 47. This combination provides an elongated dual auger arrangement that substantially uniformly moves various types of manure materials forwardly within the bin 22, such feed commencing near the rear end of the dual auger assemblies in order to provide a flow of material from the rear of the bin 22, downwardly into the dual augers, and forwardly therealong toward the front end wall 41. This type of feed flow is assisted by sidewalls that include substantially vertical wall portion 49 and relatively steep inwardly sloping wall portions 51 which cooperate to provide a wide-mouth access for the manure to the dual auger assemblies 29, 39.

The effectiveness of the dual auger feed arrangement can be further enhanced by including an elongated spacer ridge 52 that assists in the task of having the auger flights move the manure material forwardly. This task is further assisted by the generally arcuate sidewall bottom panels 53 which join the inwardly sloping wall portions 51 with the bottom wall 54. Accordingly, the bin 22 can be thus provided with a generally W-shaped configuration. When in use, the manure material can be heaped high within the bin 22, and it begins to sink into the auger assemblies.

Each auger assembly 29, 39 further includes an outfeed section toward the front end portion of the auger assembly 29, 39. Each outfeed section has at least one outfeed blade 55 which has a profile that is substantially greater in its radial extent than are the shallow auger flights 47. This deep blade profile includes a longitudinal shaft portion 56 that has a substantially smaller cross-section than does the longitudinal auger shaft portion 48 that is upstream of this shaft portion 56.

Figure 4:
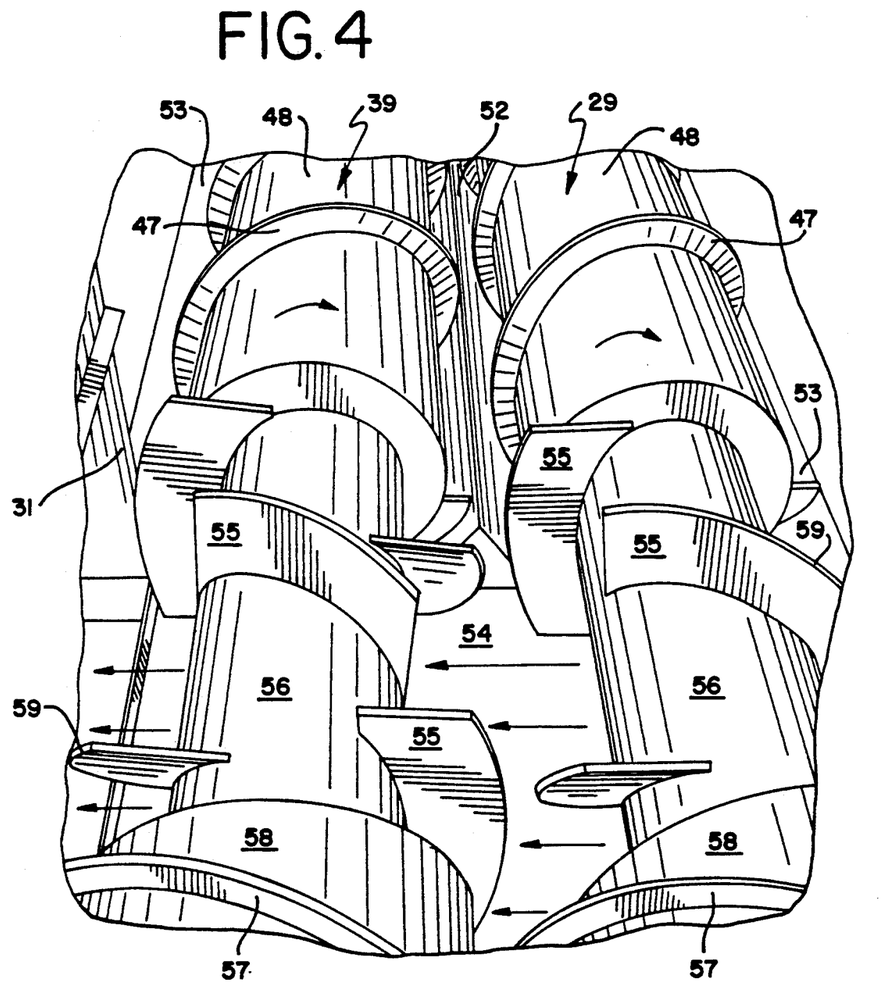
FIG. 4 is a top perspective view of a portion of an embodiment of the illustrated device.

It will be noted that the spacer ridge 52 and at least one of the generally arcuate sidewall bottom panels 53 are not present in that area which is generally below reduced diameter shaft portion 56. In the illustrated embodiment, this provides a substantially flat pathway defined primarily by the bottom wall 54. This combination of the reduced diameter shaft portion 56, the flat pathway, and the relatively deep outfeed blades 55 provides means for directing the manure augered by the auger assemblies 29, 39 toward the opening 31. When gate 33 is opened, the manure will pass through the opening 31 and to the beater assembly 28. Generally speaking, the manure will be augered toward the end of the outfeed pathway that is spaced away from the opening 31. In FIG. 4, this direction is toward the right-hand side of bottom wall 54. Accordingly, the augered manure drops into the outfeed pathway primarily at a location to the right of reduced-diameter shaft portion 56 of the auger assembly 29 (as viewed in FIG. 4) and between the respective reduced-diameter shaft portions 56 of auger assemblies 29 and 39.

In the illustrated preferred embodiment, each auger assembly 29, 39 also includes a front end section. Typically, this front end section includes shallow auger flights 57 and a relatively large diameter shaft 58. In the illustrated preferred embodiment, shafts 58 have approximately the same diameter as shafts 48, and flights 57 have substantially the same depth as auger flights 47. However, auger flights 58 are arranged in the preferred embodiment as a helix reversed in orientation from that of the auger flights 48. Manure at the front end of the bin 22 moves in a direction away from the front end wall 41. With this arrangement, auger flights 48 move the manure generally forwardly, and auger flights 58 move the manure generally rearwardly within the bin 22. In both instances, the manure is moved into the outfeed area of the auger assemblies 29, 39, as generally defined by the reduced-diameter shaft portions 56, the outfeed blades 55 and the outfeed pathway typically including the bottom wall 54. Thus, all of the manure within the bin 22 is directed toward this outfeed location, the manure generally dropping thereinto as it is augered or conveyed and through to this wide-mouth outfeed location.

One result of this movement generally downwardly into the outfeed location is a loosening of the manure material by permitting spaces to form therebetween as same falls into the outfeed location and is engaged by the rotating outfeed blades 55. Packed and/or congested volumes of manure material tend to be broken up by this action, thus facilitating movement of the manure material through the outfeed section and toward the opening 31.

While the combination just discussed does facilitate handling of manure materials including those which are most difficult to move, it will be appreciated that it is difficult to arrange the placement, sizing and rotational speed of the various components of the apparatus in a manner which will handle various types of manure materials while minimizing clogging and efficiently delivering any of a variety of manure materials to the beater assembly. The present invention is especially designed to handle a wide variety of manure materials—from those which are substantially liquid, to tough manures containing straw and other fibrous components, to manures of the type which are especially sticky such as poultry manures, and to those which have a high solids content and tend to be dry. It will be appreciated that, at times, manure is loaded from areas in such a manner that soil is included within the material in the bin. Especially difficult is a situation where the manure material is dry and of high solids content and in large clumps, because especially high torque forces can develop on the auger assemblies 29, 39 and other movable components of the apparatus.

The present invention allows one to handle manure materials from those which readily flow to those which are very difficult to move along a flow path. This is accomplished without requiring actual adjustment of rotating speeds of either the auger assemblies 29, 39 or of the beater assembly 28. It will be appreciated that the beater assembly 28 has a maximum capacity for receiving manure materials. There can reach a point where especially sticky manure materials or manure materials having a high solids content can begin to clog even the most efficient beater assembly when the amount of solids, particularly dry or sticky solids, entering the beater assembly is greater than the capacity of the beater assembly. In this regard, capacity refers to the volume of manure material which will be accepted by, passed through, and thrown by a beater assembly or an expeller assembly over a given period of time without placing excessive torque or other forces on the beater assembly or the drive means for the beater assembly. The maximum expelling capacity of the beater assembly is the volume of manure which will be expelled per unit of time by the beater assembly 28. For manure material to be properly expelled, the rate of manure materials fed thereto should not be greater than that which can be accepted, moved, beat and expelled by the beater assembly 28. It will be appreciated that this rate of manure material acceptance and expelling will vary depending upon the consistency or makeup of the manure material. For the same beater assembly running at the same speed and under the same conditions, a greater volume per unit time of manure materials can be handled when the manure materials are virtually liquid when compared with those that are particularly sticky or are high in solids content or have particularly dry and large clumps.

In accordance with the present invention, the structure of the outfeed section is arranged to automatically vary the volume of manure material fed per unit time to the beater assembly 28. In addition to providing the relatively deep space between the reduced-diameter shaft portions 56 and the bottom wall 54, the outfeed blades 55 cooperate to provide a slippage characteristic. The slippage characteristic allows the outfeed blades 55 to slip or cut through the volume of manure material within the outfeed section when the rate of movement of the manure material through the opening 31 begins to slow. Typically, this slowing of the manure material rate is caused by the manure material beginning to exceed the maximum expelling capacity of the beater assembly 28. Once this condition is reached, the outfeed blades 55 do not move as aggressively through the manure material within the outfeed section. This is because the blades are structured and oriented such that the friction force between the outfeed blades 55 and the manure material does not exceed the force in opposition to movement of manure material that is developed by the limits of the beater assembly flow rate capacity. That beater assembly flow rate capacity will, of course, vary depending on the manure material. If this outfeed blade friction force is greater than the beater assembly opposition force, the manure material will flow freely. If it is less, the outfeed blades 55 will begin to slip within the manure material. There will be a slowing in manure material movement when the maximum expelling capacity of the beater assembly 28 is exceeded.

Figure 3:
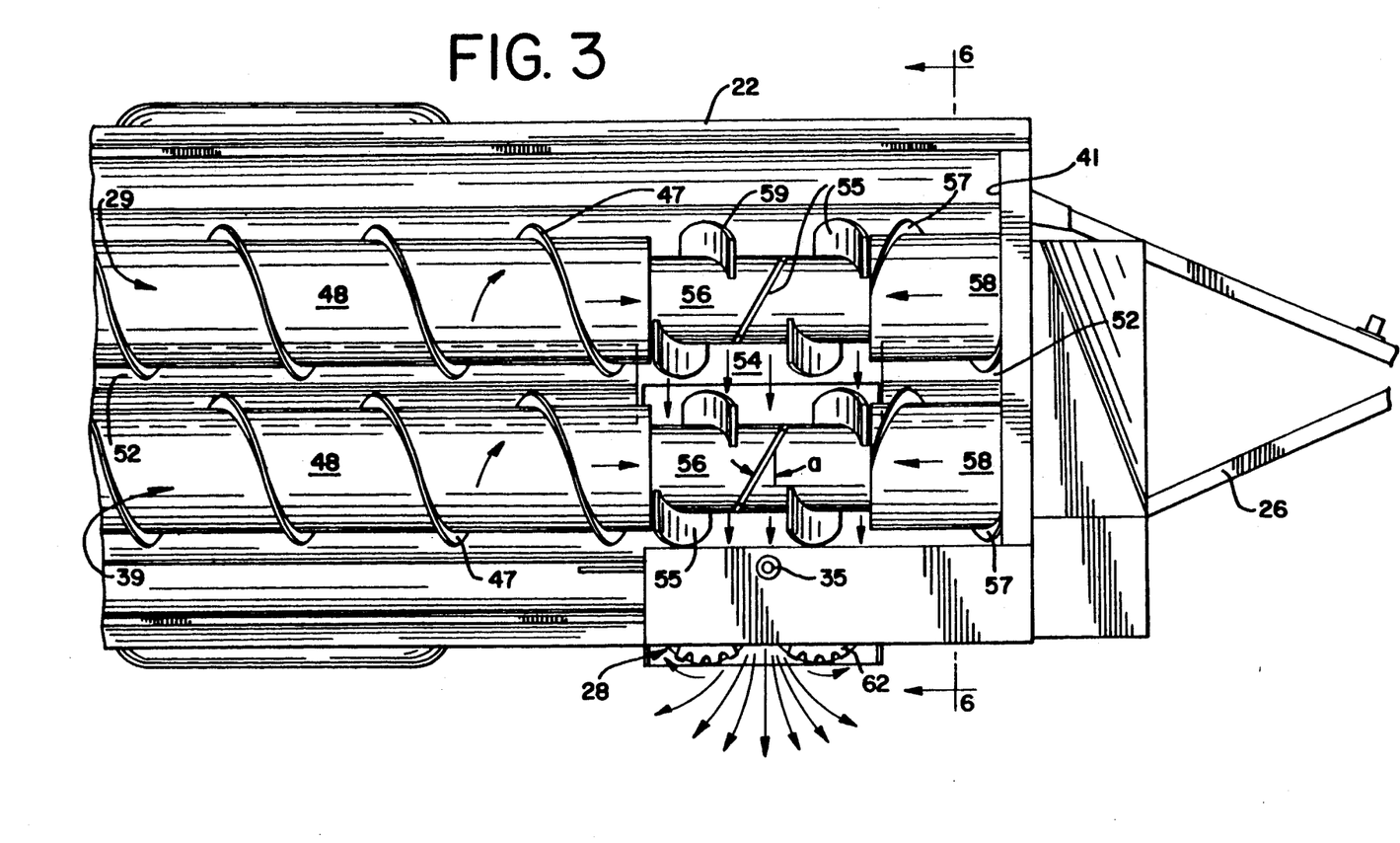
FIG. 3 is a top plan view of a portion of the illustrated device, the rear portion being broken away.

Referring particularly to the outfeed blades 55, the illustrated blades are generally arcuate in order to provide an interface between the manure and the blades 55 which exhibits relatively low friction. For example, the radially extending generally circumferential edge 59 of each blade 55 will, at the angle the blade is mounted, tend to slip through the manure material when the flow capacity limits discussed herein have been met for a particular manure material. Also, the sides of the blades 55 are substantially flat and smooth which also promotes slippage as discussed herein when at the mounting angle of the present invention. With more particular reference to the mounting angle of the outfeed blades 55, first of all, the pitch angle may be oriented in different directions. For example, as perhaps best seen in FIG. 3, the pitch angle of the central outfeed blade 55 shown in that figure is generally opposite to that of the blades on either side of it and above it (as oriented in FIG. 3). This affords good aggressiveness when the slippage conditions or flow capacity limits discussed herein are not met, that is when the manure material fed to the beater assembly 28 does not exceed the maximum expelling capacity thereof In addition, the slippage characteristic of the invention is achieved by mounting the outfeed blades 55 at a mounting angle ("a" in FIG. 3) which is generally between about 20 degrees and about 40 degrees. The especially preferred pitch angle is about 30 degrees. For example, it has been found that a pitch angle of about 45 degrees for the blades configured as shown in the preferred embodiment illustrated in the drawings was not flat enough to allow the slippage characteristic desired for the numerous variety of manures that can be handled by the spreader of the present invention. While that arrangement worked well for the thinner and less sticky manures, adequate slippage did not occur for thicker and/or more sticky manures to the extent that excessive torque developed at the beater assembly 28. It will be appreciated that, with the illustrated outfeed section including the outfeed blades 55 shaped and oriented as discussed herein, the manure material "ping pongs" from one paddle or outfeed blade 55 to another. Manure particles thus impact one blade or paddle after the other, thereby assisting in break-up of the manure material when that is necessary. This would not occur, for example, with an outfeed blade arrangement that has a shallower angle than that disclosed herein and which tends to scoop or scrape the manure material rather than simultaneously churn and move it as described in accordance with this invention. The blades or paddles also are aggressive enough to tear and break up material. For example, they can tear or shred straw or the like and they can push or break up large clumps of manure material.

It will be observed that the present invention provides a manure flow path within the bin 22 that is in the nature of a stepped-down pathway for the manure material. For example, manure moving along the large-diameter shafts 48 and 58 "step down" to the smaller diameter shaft portions 56 in the vicinity of the outfeed section. Additional steps in the depth profile of the outer flights could be provided. For example, the steps could incorporate shafts that taper along their respective lengths or that are stepped multiple time along their respective lengths. It is believed to be advantageous to provide a somewhat abrupt or precipitous step as illustrated in the drawings, whereby the manure material can be loosened by virtue of its falling down the step.

Regarding the beater assembly 28, a series of beater blades 61 are mounted onto each vertical shaft 36 in order to provide paddle-type beaters. It is preferred to have two such assemblies which counter-rotate with respect to each other. The preferred counter-rotation is illustrated by the arrows in FIG. 1 and in FIG. 3. In this way, the primary flow of manure material is between the vertical shafts 36 whereby generally opposing beater blades 61 from each of the beater assemblies generally simultaneously engage the bulk of manure material passing therethrough, the engagement being from two generally opposing sides. This results in a beating or breaking up of the manure passing therebetween. This is somewhat in the nature of a "wringer" action which shreds the manure passing therebetween. It has been found that this shredding or beating action can be rendered more efficient by including teeth 62 at the radially extending edges of the paddles 61. The individual beater paddles 61 are preferably mounted in a spiral manner as illustrated, for example, in FIGS. 1, 2 and 6. This spiral pattern is generally upwardly oriented and assists in imparting a lift to the manure as it is expelled from the beater assembly 28. Beater assembly preferably includes a support disk 63. Each disk 63 preferably includes at least one protruding plate 64 which helps to expel liquid components of the manure materials as the support disk 63 rotates with the beater assembly 28.

Figure 2:
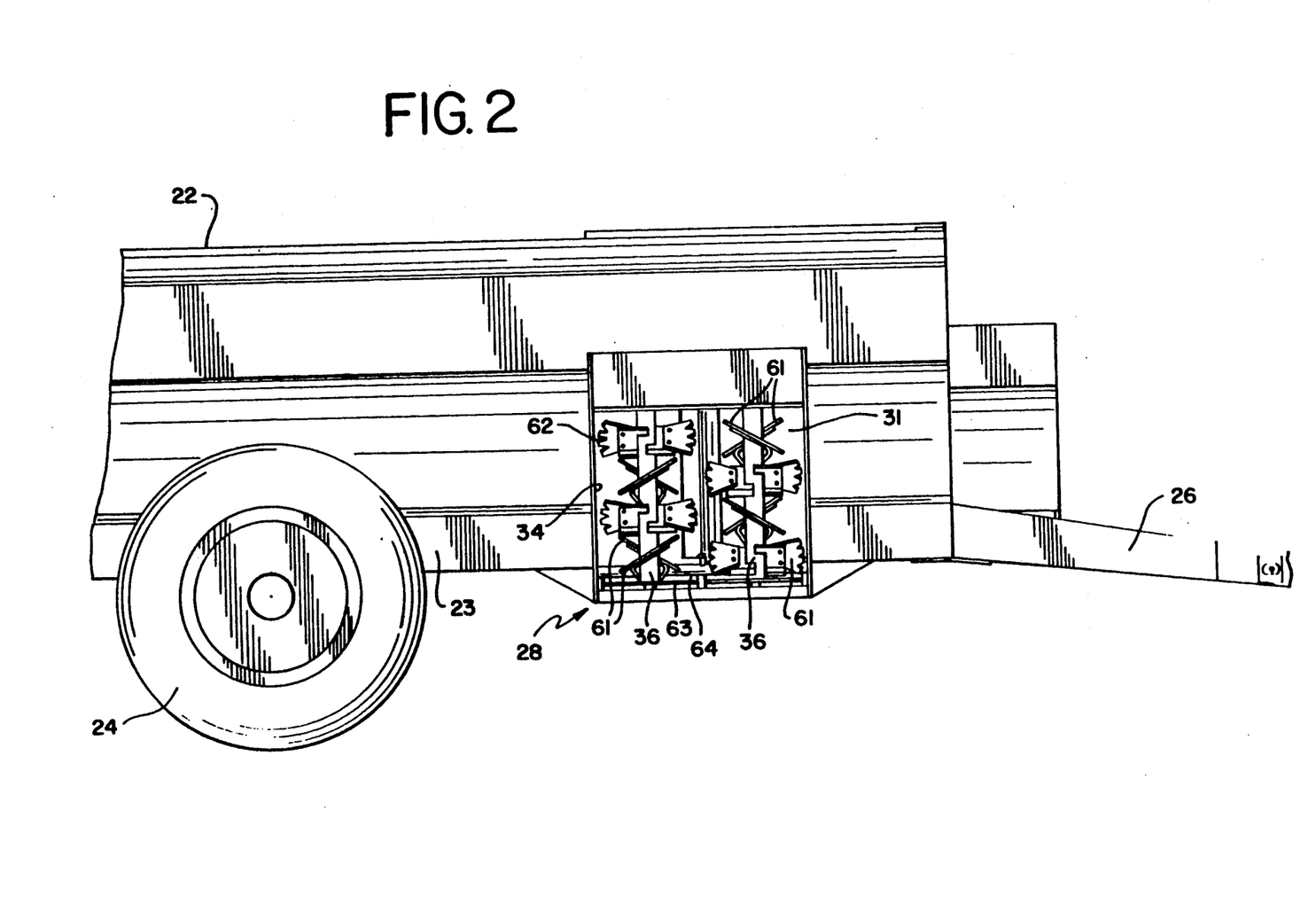
FIG. 2 is a side elevational view, partially broken away, of the device shown in FIG. 1.
Figure 6:
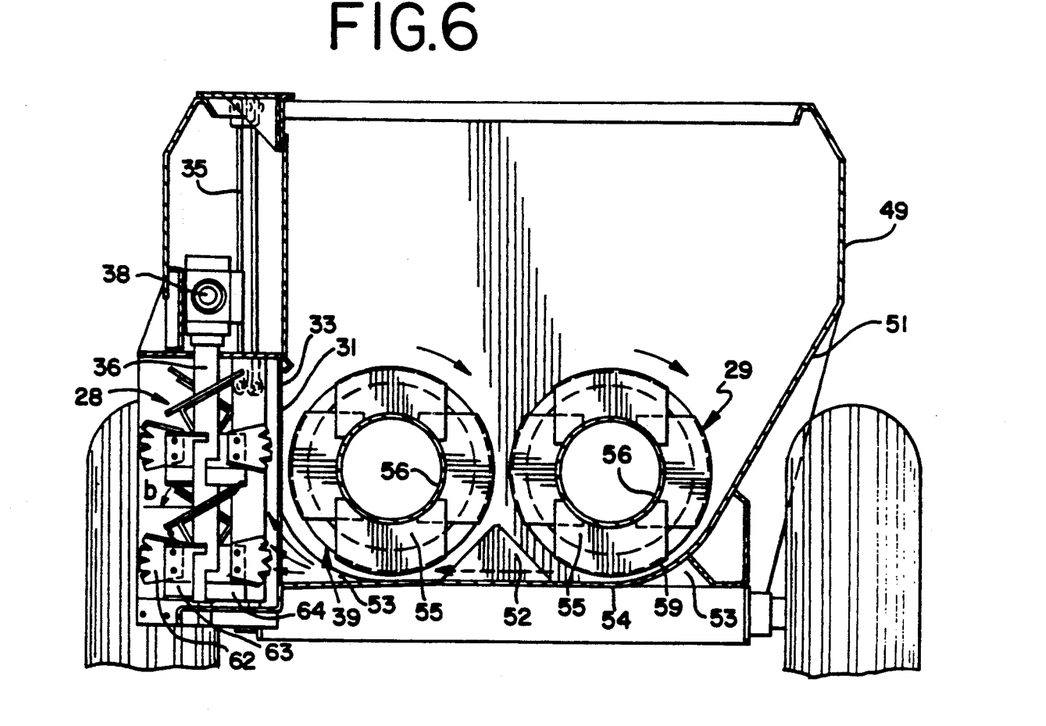
FIG. 6 is a cross-sectional view taken along the line 6—6 of FIG. 3.

Each beater blade or paddle 61 can be mounted at an acute angle with respect to the diameter of the shaft 36 (angle "b" illustrated in FIG. 6). The illustrated angle is about 30 degrees, which represents an acceptable angle that provides the feeding and shredding action as well as the lifting action for the types of beater paddles 61 illustrated in the preferred embodiment. Generally speaking, this pitch angle of the beater paddles 61 can vary between about 20 degrees and about 40 degrees. The beater paddles 61 are mounted along respective vertical shafts 36 in a staggered manner with respect to each other, as generally illustrated in FIG. 2 wherein respective paddles from the opposing vertical shafts 36 alternate with respect to each other at the locations where the paddles from the respective vertical shafts 36 are closest to each other.

The embodiment illustrated in the drawings feeds the manure generally toward the front portion of the bin 22. Feed toward the rear of the bin 22 could also be practiced, although a front feed device is more easily designed to give superior rear ground clearance. Also, a machine feeding toward its front end can be more easily kept in balance to ensure satisfactory hitching and traveling attributes since, as the manure unloads, the manure weight is constantly being directed toward the front of the manure spreader.

The apparatus and method of the present invention permit the handling of large loads of manure material without requiring especially high sidewalls inasmuch as the bin 22 includes plurality of unloading augers that are placed side-by-side in the wide-mouth bottom of the bin 22. Volume and feeding efficiency are further enhanced by providing sidewalls which are unusually steep for these types of devices and while explicitly avoiding a V-shaped tank or bin configuration that has been found to encourage undesirable bridging within the bin 22. The plurality of auger assemblies, preferably in a dual auger construction, allows the manure spreader 21 to utilize a wide bottom section in order to provide added volume without needing to increase the height of the bin 22.

While particular embodiments of the invention have been shown and described, it will be appreciated by those skilled in the art that changes and modifications may be made therein without departing from the invention in its broader aspects; and, therefore, the aim in the appended claims is to cover all such changes and modifications as fall within the true spirit and scope of the invention.

I claim:

1. A manure spreader for distributing any of a variety of manure materials having varying consistencies, comprising:

a bin mounted onto a frame having ground engaging wheels, said bin having a side wall and an opening therethrough;

at least two auger assemblies longitudinally mounted with the bin in side-by-side relationship, said auger assemblies partially define outfeed means generally adjacent to said opening of the sidewall, and said auger assemblies include means for feeding manure materials in a feed direction longitudinally generally along the auger assemblies;

a beater assembly positioned generally at said sidewall opening, said beater assembly having beater paddles for receiving manure materials from said outfeed means and for distributing such manure material onto a field, said beater assembly having a limited expelling rate capacity for distributing the manure material, said beater assembly having at least one generally vertical shaft onto which said beater paddles are mounted;

drive means for rotating said auger assemblies and for rotating said shaft of the beater assembly;

each auger assembly includes at least two different flight profiles, one such profile including members for moving the manure materials toward and into said outfeed means, and the other such profile including outfeed blade members partially defining the outfeed means, said outfeed blade members being positioned to receive the manure material from said one such profile and for delivering the thus received manure material to said beater assembly; and said outfeed means is further defined by a lower wall of the bin, said outfeed blade members move the manure materials generally between said lower wall and said other such profiles of the auger assemblies, and said blade members are mounted to exhibit a slippage characteristic with respect to the manure material within the outfeed means whereby manure material moved into the beater assembly by the outfeed means is retarded when manure material fed to the outfeed means exceeds the expelling rate capacity of the beater assembly.

2. The manure spreader in accordance with claim 1, wherein said beater assembly includes at least two of said generally vertical shafts onto which said beater paddles are mounted, and wherein the paddles on alternating vertical shafts are staggered with respect to each other while the shafts rotate in counter-rotating directions.

3. The manure spreader in accordance with claim 2, wherein said beater blades are secured to one of said respective generally vertical shafts at a pitch angle of between about 20 degrees and about 40 degrees with respect to the diameter of the respective vertical shaft.

4. The manure spreader in accordance with claim 1, wherein said outfeed blade members of the outfeed means have a curved radially extending edge and have generally flat side surfaces that facilitate the slippage characteristic of the outfeed means.

5. The manure spreader in accordance with claim 4, wherein each said auger assembly at the outfeed means has a shaft portion, and each said outfeed blade member is secured to the shaft portion at an angle of between about 20 degrees and about 40 degrees with respect to the diameter of the shaft portion.

6. The manure spreader in accordance with claim i, wherein said beater paddles include teeth at a radially extending edge thereof, and said beater paddles are mounted in a generally spiral manner onto the generally vertical shaft.

7. The manure spreader in accordance with claim 1, wherein said opening is closable and openable to varying extents by a door assembly.

8. The manure spreader in accordance with claim 1, wherein said drive means rotates said auger assemblies at a slow speed relative to the speed at which said beater assembly is rotated.

9. The manure spreader in accordance with claim 1, wherein said auger assemblies are dual augers, each of which rotates in the same rotational direction generally away from said opening in the sidewall and generally toward one end of said outfeed means which is generally opposite of said sidewall opening.

10. The manure spreader in accordance with claim 1, wherein said sidewall and an opposing sidewall of said bin are substantially steep and have portions which are generally vertical.

11. The manure spreader in accordance with claim 1, wherein said one such flight profile of each auger assembly is located generally over a bottom wall of the bin which includes elongated members that generally conform to the bottom profile of said one such flight profile.

12. The manure spreader in accordance with claim 11, wherein said bin at said bottom wall portion is generally W-shaped in transverse cross-section at locations other than at said outfeed means.

13. The manure spreader in accordance with claim 1, wherein said different flight profiles of the auger assemblies provide a stepped longitudinal configuration.

14. The manure spreader in accordance with claim 1, wherein said one such flight profile of each auger assembly is provided in two sections, one such section being to the rear of said outfeed means and the other such section being to the front of said outfeed means, wherein the flight profile of the rear section is approximately 180 degrees out of phase with the flight profile of said front section.

15. The manure spreader in accordance with claim 14, wherein said flight profile ar the front and rear sections are generally helical and have generally continuous outwardly extending outer profiles.

16. The manure spreader in accordance with claim 1, wherein said drive means includes a single drive chain and sprocket assembly and planetary reducers for driving the auger assemblies.

17. The manure spreader in accordance with claim 1, wherein said drive means rotates the auger assemblies at between about 12 and about 18 rpm and said drive means rotates the beater assembly at between about 700 and about 900 rpm.

18. A method for distributing any variety of manure materials having varying consistencies, comprising the steps of:
  depositing a supply of manure material into a translatable bin having a wide-mouth configuration and a sidewall with an opening therethrough;
  augering said manure material within the bin longitudinally along at least two side-by-side auger assemblies therewithin, said augering step including moving said manure material in a feed direction flow by rotating action imparted thereto by the auger assemblies;
  said augering step including moving said manure material to an outfeed location of the bin that is deeper than the location of the auger assemblies within the bin;
  outfeeding the manure material within the outfeed location, said outfeeding step moving the manure material to a beater assembly in the vicinity of the sidewall opening, the beater assembly having a limited expelling rate capacity;
  receiving the manure from said outfeeding step by the beater assembly at a location generally external of the opening in the sidewall, including expelling manure material out of the bin in a spray pattern; and
  said outfeeding step includes slipping between said manure material and blades within the outfeeding location whereby manure material moved into the beater assembly during the outfeeding step is retarded when manure material handled during the outfeeding step exceeds the expelling rate capacity of the beater assembly.

19. The method in accordance with claim 18, wherein the augering step includes rotating the auger assemblies in the same rotational direction and moving the manure material toward one end of the outfeed location, which one end is generally opposite to the opening through the sidewall 20. The method in accordance with claim 18, wherein the outfeeding step includes engaging manure material passed through the opening from the outfeed location with a pair of counter-rotating beater assemblies rotating along respective vertical axes.

21. The method in accordance with claim 18, wherein said augering step rotates the auger assemblies at between about 12 and about 18 rpm, and said receiving step rotates the beater assembly at between about 700 rpm and about 900 rpm.

* * * * *